US006562407B1

(12) United States Patent
Bonnebat et al.

(10) Patent No.: US 6,562,407 B1
(45) Date of Patent: May 13, 2003

(54) METHOD AND DEVICE FOR CONTINUOUSLY COATING AT LEAST A METAL STRIP WITH A CROSSLINKABLE POLYMER FLUID FILM

(75) Inventors: Claude Bonnebat, Pontault Combault (FR); Frédéric Jenny, Chantilly (FR); Thierry Soas, Chantilly (FR)

(73) Assignee: Sollac, Puteaux (FR)

( * ) Notice: Subject to any disclaimer, the term of this patent is extended or adjusted under 35 U.S.C. 154(b) by 0 days.

(21) Appl. No.: 09/857,976

(22) PCT Filed: Dec. 9, 1999

(86) PCT No.: PCT/FR99/03040

§ 371 (c)(1),
(2), (4) Date: Jun. 13, 2001

(87) PCT Pub. No.: WO00/35593

PCT Pub. Date: Jun. 22, 2000

(30) Foreign Application Priority Data

Dec. 16, 1998 (FR) ........................................... 98 15901
Dec. 16, 1998 (FR) ........................................... 98 15900

(51) Int. Cl.[7] ............................ B05D 3/00; B05D 1/28; B01J 19/08; B29C 47/00; B05C 1/08

(52) U.S. Cl. .................... 427/375; 427/376.4; 427/384; 427/388.1; 427/428; 427/373.2; 427/457; 156/230; 156/242; 156/244.11; 156/272.2; 156/273.3; 118/249; 118/261; 118/641

(58) Field of Search ................................ 156/236, 231, 156/233, 242, 244.11, 272.2, 273.3, 370.6, 396, 499, 500; 427/457, 132, 178, 211, 357, 360, 373.2, 375, 376.4, 384, 388.1, 428, 435; 118/240, 202, 641, 642, 643, 60, 261

(56) References Cited

U.S. PATENT DOCUMENTS

| | | | | | |
|---|---|---|---|---|---|
| 3,239,367 | A | * | 3/1966 | Demeter | 117/68 |
| 3,371,002 | A | * | 2/1968 | Reddeman | 156/244 |
| 4,041,197 | A | * | 8/1977 | Gagne | 427/278 |
| 4,306,927 | A | * | 12/1981 | Funk et al. | 156/243 |
| 4,485,132 | A | * | 11/1984 | Furuzono et al. | 427/428 |
| 4,990,364 | A | * | 2/1991 | Bolte et al. | 427/44 |
| 5,310,573 | A | * | 5/1994 | Tanokuchi et al. | 427/9 |
| 5,407,702 | A | | 4/1995 | Smith et al. | |
| 5,585,909 | A | * | 12/1996 | Behe et al. | 355/285 |
| 5,677,008 | A | * | 10/1997 | Kameya et al. | 427/428 |
| 6,033,513 | A | * | 3/2000 | Nakamura et al. | 156/230 |

FOREIGN PATENT DOCUMENTS

| | | | | |
|---|---|---|---|---|
| FR | 2767074 A | * | 2/1999 | B05C/1/08 |

* cited by examiner

*Primary Examiner*—J. A. Lorengo
(74) *Attorney, Agent, or Firm*—Sughrue Mion, PLLC

(57) ABSTRACT

The invention concerns a method for continuously coating at least a metal strip with a crosslikable polymer fluid film free of non-active solvent or diluent and whereof the softening temperature is higher than 50° C. The method consists in continuously unwinding the metal strip (1) on at least a back-up roll (3); forming, on a roll (20) by forced flow, a layer of said crosslinkable polymer in melted state; forming, from said layer (30), said crosslinkable polymer film (31); and transferring entirely in thickness said film onto the metal strip (1) and, between the zone forming the layer (30) on the roll (20) and the zone applying the film (31) on the metal strip, in thermally conditioning the crosslinkable polymer to reduce its viscosity. The invention also concerns a coating device for implementing said method.

13 Claims, 5 Drawing Sheets

METHOD AND DEVICE FOR CONTINUOUSLY COATING AT LEAST A METAL STRIP WITH A CROSSLINKABLE POLYMER FLUID FILM

BACKGROUND OF THE INVENTION

The subject of the present invention is a process and an apparatus for the continuous coating of at least one metal strip with a thin fluid film of crosslinkable polymer containing no unreactive solvent or diluent.

Thermally crosslinkable polymers such as, for example, thermosetting polymers, or physically crosslinkable polymers such as, for example, photocurable polymers, are known.

There is a wide variety of thermosetting organic coatings which are continuously applied to metal substrates.

In most cases, these are complex formulations which combine, in a solvent or aqueous medium, a system of prepolymer functional organic binders, a crosslinking system and additives such as pigments or fillers, and various formulation adjuvants.

Various processes are also known for applying a thermoplastic or thermosetting organic coating to a bare or coated metal strip.

The application of organic coatings such as, for example, liquid paints or varnishes is usually carried out by roller coating these liquid coatings in the state of a solution or of a dispersion in an aqueous or solvent medium.

To do this, the liquid coating is deposited on a metal strip by producing the solution or dispersion using a system comprising two or three rollers and by transferring some or all of this liquid coating thus predosed onto an applicator roller in contact with the surface of the metal strip to be coated.

The transfer is performed either by friction of the applicator roller on the metal strip, the two surfaces in contact running in opposite directions, or by contact in the same direction.

An advantageous trend in the technology of continuous application of crosslinkable polymer coatings, such as thermosetting paints or varnishes for example, to a metal strip consists in depositing this coating without the use of a solvent or a diluent.

Several alternatives have been proposed for producing and applying organic coatings without the use of an unreactive solvent or diluent.

Thus, to produce thin coatings of viscous organic products, another technique consists in extruding the organic coating in the fluid state and in applying this coating to a substrate by coating or lamination.

The extrusion-coating of a thin organic coating is widely practised, particularly with thermoplastic polymers on flexible surfaces, such as paper, plastic films, textiles or even thin metal substrates such as packaging metals.

The coating is applied in the melt state by means of a rigid sheet die or of a nozzle positioned in direct contact with the substrate.

The pressure exerted by the die on the substrate comes from the viscosity of the melt. Thus, the possibilities of correcting flatness defects of the substrate by pressing the latter against the back-up roll are very limited.

This extrusion-coating technique requires strict parallelism between the edges of the die and the substrate, and this substrate must be either perfectly plane or be deformable in order to allow a thin coating of uniform thickness to be formed.

This is because the thickness of the material deposited is controlled by the gap and the pressure between the die and the substrate, which requires strict parallelism between these two elements when it is desired to apply coatings with a very small thickness.

This condition cannot be achieved in the case of steel strip having a thickness of between 0.3 and 2 mm, which is too rigid and has a flatness or thickness uniformity which is insufficient to allow such an accurate adjustment of the gap between the die and the substrate, particularly in the case of wide strip.

The technique of extrusion lamination of a uniform layer of fluid coating on a substrate uses the drawing beneath the die of a fluid sheet at the exit of a sheet die, this sheet then being pressed against the substrate with the aid, for example, of a cold roller or of a rotating bar, or else by an air knife or an electrostatic field.

In this case, the thickness of the fluid sheet is controlled by the flow rate of the material in the die section and by the speed of the substrate.

Should the fluid sheet stick on the pressing roller, the sheet would then separate into two parts in its thickness, one part being applied to the substrate and the other part remaining applied to the roll. This separation of the sheet therefore means that transfer is not complete and the coating obtained on the substrate has neither a satisfactory surface appearance nor a uniform thickness.

In order to prevent the fluid sheet from sticking on the pressing roller, the latter must have a perfectly smooth and cooled surface.

The pressing pressure must however be low enough to prevent the formation of a calendering bead and consequently, this mode of transfer does not make it possible to compensate for any thickness variations and discrepancies in flatness in the case of a rigid substrate.

This technique of applying the coating with the formation of a free strand at the exit of the extrusion die makes it possible to avoid the problems of coupling between the die and the rigid substrate, but it causes application instabilities if the length of the free strand fluctuates and it is difficult to use with thermosetting systems having a viscosity of less than 2000 Pa·s because of the difficulties in achieving uniform drawing and good lamination.

In general, in the various known techniques mentioned above, the continuous application of a thin organic coating to metal substrates is carried out with low contact pressures, insufficient to allow production of a thin uniform coating applied homogeneously to rigid substrates which may have flatness and thickness-heterogeneity discrepancies.

These various application techniques do not make it possible to compensate for the variations in thickness of the metal substrate, which variations consequently cause unacceptable fluctuations in the thickness of the coating, especially if the substrate is formed by a metal strip which exhibits significant surface roughness and/or corrugations of amplitude equal to or greater than the thickness of the coating to be produced on the said metal strip.

Moreover, these various application techniques do not make it possible to allow for variations in the width of the substrate nor variations in the transverse positioning of this substrate, so that the coating cannot be deposited uniformly over the entire width of the substrate.

Finally, during application of the coating, air microbubbles may be trapped between the coating and the substrate, which is to the detriment of homogeneous application and to the surface appearance of this coating.

Thus, a continuous application of a coating of crosslinkable polymer with a small and uniform thickness on a metal strip poses problems because this metal strip has flatness and thickness defects together with significant roughness and/or corrugations of amplitude equal to or greater than the thickness of the coating film to be deposited on the said strip, even when this strip is pressed with a high force on a uniform roll.

In addition, the various techniques used hitherto do not make it possible to apply, to a metal strip, a thin coating of crosslinkable polymer containing no unreactive solvent or diluent meeting two contradictory requirements, namely hardness and deformability.

This is because, after crosslinking the polymer coating must be hard enough while still being deformable in order to allow the sheet thus coated to be formed without a coating undergoing degradation or separation.

Now, it is known that increasing the molecular mass of the crosslinkable precursers of the polymer is highly favourable to obtaining a final coating which is both hard and deformable.

However, increasing the molecular mass of the precursors has a very unfavourable effect on the viscosity of a polymer containing no unreactive solvent or diluent, thereby impairing the ease of transfer and of application of the sheet, in the uncrosslinked melt state, to the metal strip.

SUMMARY OF THE INVENTION

The object of the invention is to avoid these drawbacks by providing a process and an apparatus for the continuous coating of at least one metal strip with a thin fluid film of crosslinkable polymer containing no unreactive solvent or diluent, and the softening temperature of which is greater than 50° C., making it possible to obtain a coating of uniform thickness of a few microns to a few tens of microns, applied homogeneously to this strip, while preventing air microbubbles from being trapped between the film and the metal strip and obviating discrepancies in the flatness and roughness of this strip as well as allowing application on part or all of the coating, despite the fluctuations in width and transverse positioning of this strip.

The subject of the invention is therefore a process for the continuous coating of at least one metal strip with a fluid film of crosslinkable polymer containing no unreactive solvent or diluent and the softening temperature of which is greater than 50° C., the said film having a thickness of less than that of the metal strip, characterized in that:

the metal strip is made to run continuously over at least one back-up roll;

a sheet of the said crosslinkable polymer is formed, on a roll and by forced flow at a temperature greater than the softening temperature of the crosslinkable polymer, the said polymer being crosslinkable in the melt state and having a viscosity greater than 10 Pa·s under the conditions of formation of the said sheet, the temperature of formation of this sheet being lower than the crosslinking onset temperature of the crosslinkable polymer and the said roll being driven in rotation in the opposite direction to the direction in which the metal strip runs;

the said film of crosslinkable polymer is formed from the said sheet;

the film is completely transferred, thicknesswise, onto the metal strip; and between the region of formation of the sheet on the roll and the region of application of the film to the metal strip, the crosslinkable polymer is thermally conditioned using suitable methods for lowering the viscosity of this crosslinkable polymer to a value less than the said viscosity measured under the conditions of the said forced flow.

The subject of the invention is also an apparatus for the continuous coating of at least one metal strip with a fluid film of crosslinkable polymer containing no unreactive solvent or diluent and the softening temperature of which is greater than 50° C, the said film having a thickness of less than that of the metal strip, characterized in that it comprises:

means for continuously driving the metal strip;

at least one back-up roll supporting the metal strip;

means for forming, on a roll and by forced flow at a temperature greater than the softening temperature of the crosslinkable polymer, a sheet of the said polymer crosslinkable in the melt state and having a viscosity greater than 10 Pa·s under the conditions of formation of the said sheet, the temperature of formation of this sheet being lower than the crosslinking onset temperature of the crosslinkable polymer and the said roll being driven in rotation in the opposite direction to the direction in which the metal strip runs;

means for forming, from the said sheet, the said film of crosslinkable polymer and for completely transferring, thicknesswise, this film onto the metal strip;

and, between the region of formation of the sheet on the roll and the region of application of the film to the metal strip, means for thermally conditioning the crosslinkable polymer using suitable methods for lowering the viscosity of this crosslinkable polymer to a value of less than the said viscosity measured under the conditions of the said forced flow.

BRIEF DESCRIPTION OF THE DRAWINGS

The features and advantages of the invention will emerge during the description which follows, given solely by way of example and with reference to the appended drawings in which.

DETAILED DESCRIPTION OF THE INVENTION

Figure 1:
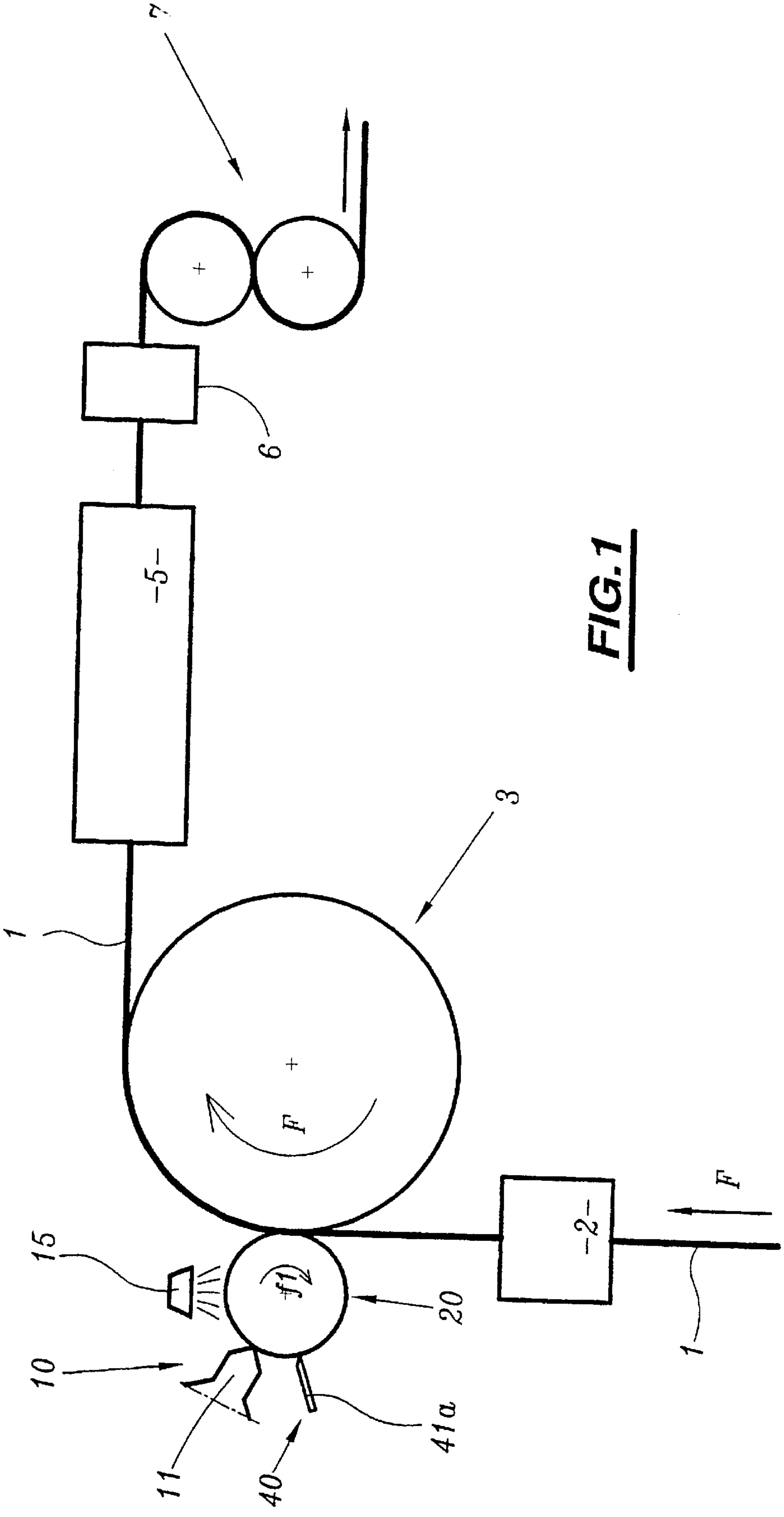
FIG. 1 is a schematic side view of a plant for coating a metal strip with a film of crosslinkable polymer, comprising a first embodiment of an apparatus for applying this coating, according to the invention.
Figure 3:
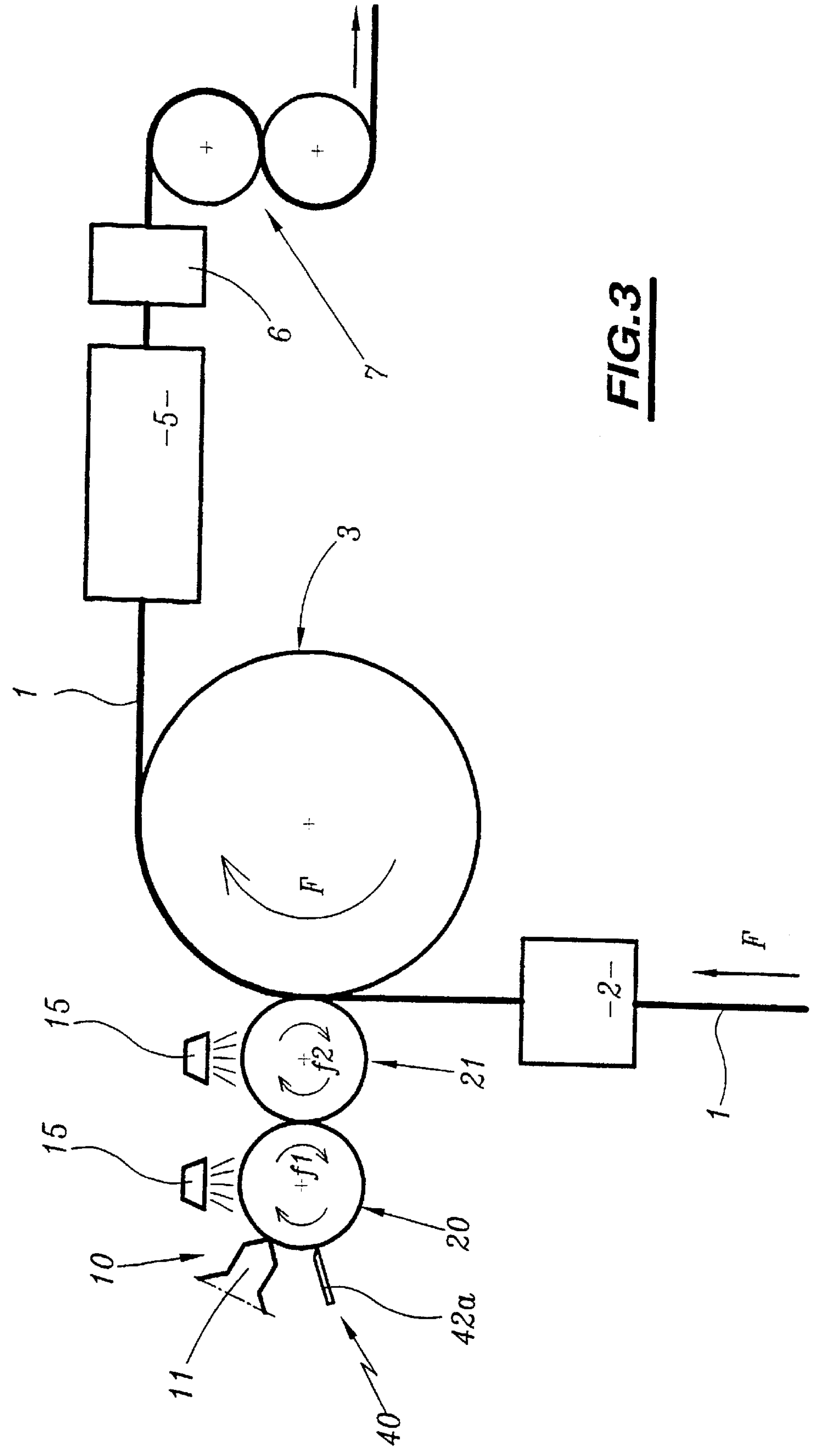
FIG. 3 is a schematic side view of a plant for coating a metal strip with a film of crosslinkable polymer, comprising a second embodiment of an apparatus for applying this coating, according to the invention.

FIGS. 1 and 3 show schematically two plants for the continuous coating of a metal strip 1 with a film of fluid crosslinkable polymer containing no unreactive solvent or diluent and with a thickness of, for example, between 5 and 50 μm.

This metal strip 1 has a thickness of, for example, between 0.10 and 4 mm and is, for example, made of steel or aluminium or of an aluminium alloy and can be coated or prepainted on one or both of its sides.

The polymer used to coat the metal strip 1 is a polymer containing no unreactive solvent or diluent and is thermally crosslinkable, such as a thermosetting polymer for example, or physically crosslinkable, such as a photocurable polymer for example.

This polymer has, in the uncrosslinked state, a softening temperature greater than 50° C.

These polymers have softening, flow-onset, crosslinking-onset and rapid-crosslinking temperatures which are different.

In general, the crosslinking onset temperature is the temperature above which an increase in the viscosity of more than 10% is observed in less than 15 minutes.

In the illustrative examples shown in FIGS. 1 and 3, the metal strip 1 is driven so as to run in the direction of the arrow F and this metal strip 1 is applied against at least one back-up roll 3.

The plants include means 2 for preheating the metal strip 1 to a temperature approximately equal to or greater than the temperature of the fluid film of crosslinkable polymer to be deposited on the said metal strip 1 and equal to or greater than the softening temperature of this crosslinkable polymer.

The means 2 for preheating the metal strip 1 consist, for example, of at least one induction furnace.

These plants also include, from the upstream end to the downstream end:

an apparatus denoted in its entirety by the reference 10, for coating the metal strip 1 with a film of fluid crosslinkable polymer containing no unreactive solvent or diluent and the softening temperature of which is greater than 50° C.;

means 5 for curing or crosslinking the film of crosslinkable polymer;

and a unit 7 for hauling off the metal strip 1.

If the polymer is thermally crosslinkable, the curing means 5 comprise, for example, at least one induction oven and cooling means 6, and if the polymer is physically crosslinkable, the curing means 5 may consist of ultraviolet lamps or of electron beams.

The film of crosslinkable polymer to be deposited on the metal strip 1 must be of uniform thickness, although this metal strip 1 has thickness heterogeneities or flatness defects as well as significant roughness and/or corrugations of amplitude greater than or equal to the thickness of the film to be deposited on the metal strip 1.

In general, the coating apparatus 10 comprises:

means 11 and 12 for forming, on a roll 20 and by forced flow at a temperature greater than the softening temperature of the crosslinkable polymer, a sheet 30 of the said polymer crosslinkable in the melt state and having a viscosity greater than 10 Pa·s and preferably between 20 Pa·s and 2000 Pa·s under the conditions of formation of the said sheet 30, the temperature of formation of this sheet 30 being lower than the crosslinking onset temperature of the crosslinkable polymer;

means for forming, from the said sheet 30, the film 31 of crosslinkable polymer and for completely transferring, thicknesswise, this film 31 onto the metal strip 1;

and, between the region of formation of the sheet 30 on the roll 20 and the region of application of the film 31 to the metal strip 1, means 15 for thermally conditioning the crosslinkable polymer using suitable methods for lowering the viscosity of this crosslinkable polymer to a value of less than the said viscosity measured under the conditions of the said forced flow.

The means for forming, by forced flow, the sheet 30 of crosslinkable polymer comprise, for example, an extruder, not shown, of conventional type, provided with a die 11 having an extrusion slot 12 and a flow regulator, not shown, consisting, for example, of a metering pump placed between the extruder and the die 11.

Figure 2:
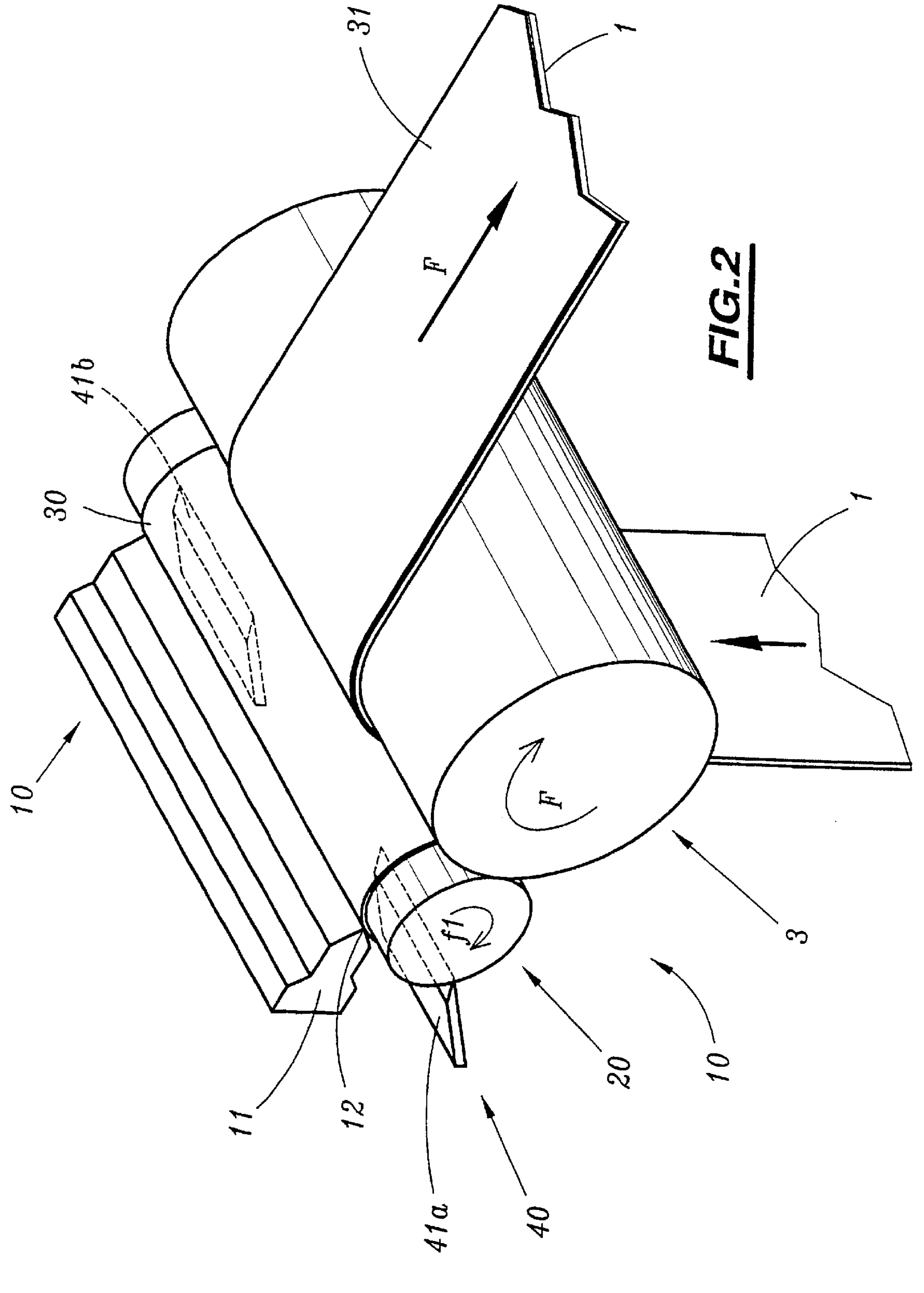
FIG. 2 is a schematic perspective view of the application apparatus of FIG. 1.

According to a first embodiment of the plant shown in FIGS. 1 and 2, the means for forming and for completely transferring, thicknesswise, the film 31 of crosslinkable polymer are formed by the roll 20 and by means for compressing the metal strip 1 between the roll 20 and the back-up roll 3 in order to obtain a coating of uniform thickness.

Transfer is regarded as being complete or almost complete, thicknesswise, when more than 90% of the material has been transferred.

The roll 20 is heated to a temperature approximately equal to or greater than, on the one hand, the temperature of formation of the sheet 30 and, on the other hand, the softening temperature of the crosslinkable polymer and is driven in rotation, by suitable means, not shown, in the opposite direction to the direction in which the metal strip 1 runs, as shown by the arrows f1 in FIGS. 1 and 2.

With respect to the back-up roll 3 for supporting the said metal strip 1, the roll 20 is driven in rotation in the same direction as this roll 3.

The roll 20 has a metal core coated with a jacket of deformable material, such as an elastomer for example, and the back-up roll 3 has a hard surface.

According to one variant, the roll 20 has a hard surface and the back-up roll 3 has a metal core coated with a jacket of deformable material, such as an elastomer for example.

The sheet 30 of the said crosslinkable polymer is formed, for example, by extrusion coating or by extrusion lamination.

In the case of extrusion coating, as shown in FIG. 2, the means for forming the sheet 30 by forced flow are formed by the die 11 bearing against the surface of the roll 20 and provided with means, of the conventional type, for adjusting the position of the edges of the extrusion slot 12 of the said die 11 with respect to the surface of the roll 20.

The die 11 of the extruder provides the uniform distribution of the sheet 30 which is obtained by varying the output through the die 11 and the speed of rotation of the roll 20.

The die 11 is applied against the roll 20, for example by means of cylinders, not shown, the pressure of which makes it possible to make the mode of output of the fluid crosslinkable polymer uniform.

Because of the strict parallelism between the die 11 and the roll 20, a sheet 30 of uniform thickness is formed on the latter.

In the case of extrusion lamination, as shown in FIG. 3, the means for forming the sheet 30 by forced flow are formed by the die 11, means for drawing the sheet 30 by adjusting the output from this die 11 and/or by adjusting the speed of rotation of the applicator roll 20, means, of conventional type, for adjusting the position of the edges of the extrusion slot 12 of the said die 11 with respect to the surface of the roll 20 and by means, not shown, for pressing the sheet 30 against the said surface of the applicator roll 20.

The means for pressing the sheet 30 against the surface of the roll 20 are formed, for example, by an air knife, directed towards this roll 20 along the contact generatrix of the said sheet 30 on the said applicator roll 20.

Figure 4:
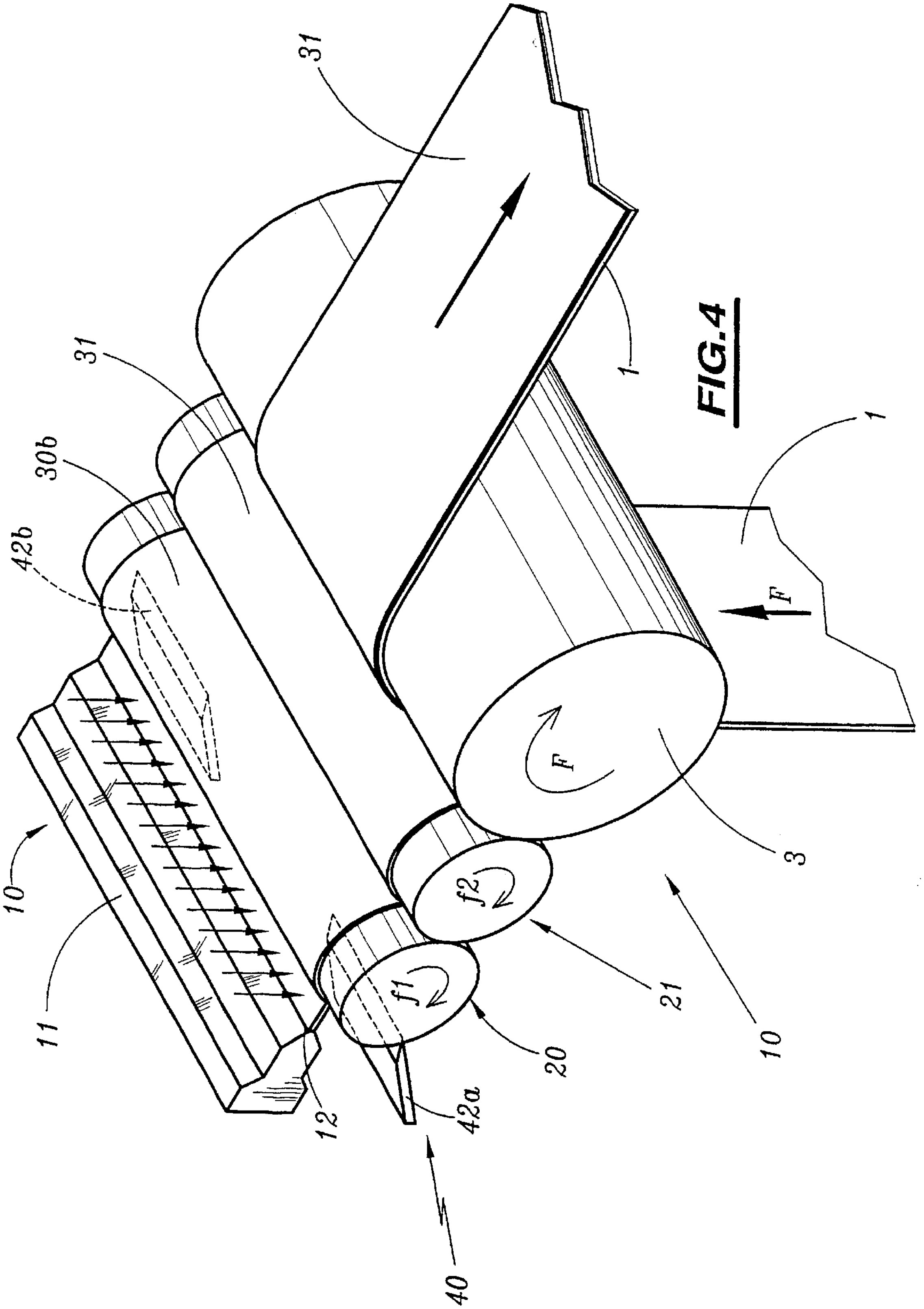
FIG. 4 is a schematic perspective view of the application apparatus of FIG. 3.

In the embodiment shown in FIGS. 3 and 4, the means for forming and for completely transferring, thicknesswise, the film 31 of crosslinkable polymer onto the metal strip 1 comprise:

the roll 20 for forming an intermediate sheet 30*b* of crosslinkable polymer from the sheet 30;

an intermediate transfer element 21 inserted between the roll 20 and the metal strip 1 and driven in rotation in the opposite direction to the direction in which the metal strip 1 runs in order to form the film 31 of crosslinkable polymer from the intermediate sheet 30*b;* means for compressing the transfer element 21 between the roll 20 and the back-up roll 3 in order to transfer the intermediate sheet 30*b* onto the said transfer element 21;

and means for compressing the metal strip 1 between the transfer roll 21 and the back-up roll 3 in order to transfer the film 31 onto the said metal strip 1.

The roll 20 and the back-up roll 3 each have a hard surface and the transfer element is formed by a transfer roll 21 or applicator roll comprising a metal core coated with a jacket of deformable material, such as an elastomer for example.

According to a variant, the roll 20 and the back-up roll 3 each comprise a metal core coated with a jacket of deformable material, such as an elastomer for example, and the transfer element is formed by an applicator roll 21 having a hard surface.

According to yet another variant, the transfer element is formed by an endless belt.

In each embodiment, the roll 20, heated to a temperature approximately equal to the temperature of formation of the sheet 30 and to the softening temperature of the crosslinkable polymer, is driven in rotation in the opposite direction to the direction in which the metal strip 1 runs.

In the case of the embodiment shown in FIGS. 3 and 4, the applicator roll 21 heated to a temperature approximately equal to or greater than the temperature of the roll 20 is driven in rotation also in the opposite direction to the direction in which the back-up roll 3 for supporting the metal strip 1 runs, as shown by the arrow f2 in FIGS. 3 and 4.

The thermal conditioning of the crosslinkable polymer while the sheet 30 is in contact with the roll 20 in the case of the first embodiment shown in FIGS. 1 and 2 or while the intermediate sheet 30*b* is in contact with the roll 20 and/or while the film 31 is in contact with the transfer element 21 in the case of the embodiment shown in FIGS. 3 and 4, in order to lower the viscosity of this crosslinkable polymer, may be carried out in different ways.

According to a first embodiment, the means for thermally conditioning the crosslinkable polymer are formed by an internal system for heating the roll 20 and/or for heating the applicator roll 21 and/or by at least one source 15 for applying a complementary heat flux to the sheet 30 or to the intermediate sheet 30*b* and/or to the film 31.

According to a second embodiment, the means for thermally conditioning the crosslinkable polymer are formed by an internal system for heating the roll 20 and/or by an external system for heating the applicator roll 21 and/or by at least one source 15 for applying a complementary heat flux to the sheet 30 or to the intermediate sheet 30*b* and/or to the film 31.

The internal system for heating the roll 20 and/or for heating the applicator roll 21 consists of electrical resistance elements embedded in the mass of each of the said rolls or by channels provided in the said rolls for the flow of a heat-transfer fluid, such as oil for example.

If the rolls 20 and 21 have an external jacket made of deformable material, the temperature of these rolls must be controlled, for example by means of a thermocouple, not shown, so as not to exceed a limiting value in order to prevent the external jacket of deformable material from being damaged by too high a temperature and to prevent the binding layer between the deformable material and the metal core of the said rolls from deteriorating.

In the case of an external system for heating the surface of the roll 20 and/or the surface of the applicator roll 21, this heating system, not shown, is placed opposite the corresponding roll in the region not covered by the film 31 and consists, for example, of hot-air generators or infrared lamps.

The source or sources 15 for applying the complementary heat flux to the film 31 or to the intermediate sheet 30*b* and/or to the film 31 consists, for example, of infrared lamps operating at a mean absorption wavelength of between 1.5 and 4 μm or by hot-air generators or else by microwave systems.

The means for thermally conditioning the crosslinkable polymer using suitable methods therefore make it possible to lower the viscosity of this polymer, that is to say the flowability of the polymer, so as to facilitate its transfer and its application onto the metal strip 1.

The methods are suitable for lowering the viscosity of the crosslinkable polymer by at least a factor of 2, and so that the temperature of the said crosslinkable polymer exceeds the crosslinking onset temperature of this polymer.

Thus, despite the increase in the temperature of the crosslinkable polymer to a level normally considered as liable to cause the onset of crosslinking, and therefore an increase in the viscosity, this viscosity remains, at least temporarily, at a very low level facilitating the transfer and application of the film 31 of crosslinkable polymer onto the metal strip 1.

In addition, the coating apparatus 10 comprises means, not shown, of conventional type, for adjusting the tangential speeds of the roll 20 or of the roll 20 and of the applicator roll 21 in a ratio of between 0.5 and 2 times the speed at which the metal strip 1 runs.

The speeds of the roll 20 or of the roll 20 and of the applicator roll 21 may be adjusted independently of each other.

The coating apparatus 10 also comprises means, not shown, for adjusting the contact pressure between the roll 20 and the metal strip 1 (FIGS. 1 and 2) and, on the one hand, between the roll 20 and the applicator roll 21 and on the other hand, between the applicator roll 21 and the metal strip (FIGS. 3 and 4).

These means consist, for example, of hydraulic cylinders or of screw/nut systems, which make it possible to adjust the contact pressures depending on the viscosity of the crosslinkable polymer so as to ensure complete transfer of the material and to minimize the frictional forces.

As shown in FIGS. 2 and 4, the extrusion slot 12 of the die 11 and the roll 20, or the roll 20 and the applicator roll 21, have a length greater than the width of the metal strip 1 so as to cover the entire surface of the face of this metal strip 1 which is in contact with the roll 20 or the applicator roll 21.

According to a variant, the extrusion slot 12 of the die 11 and the roll 20, or the roll 20 and the applicator roll 21, may have a length less than the width of the metal strip 1 in order to coat only part of the surface of that face of the said metal strip 1 which is in contact with the roll 20 or the applicator roll 21.

According to the first embodiment shown in FIGS. 1 and 2, the thin fluid film 31 of thermally or physically crosslinkable polymer is applied in the following manner.

The metal strip 1 is maintained at a temperature equal to or greater than the softening temperature of the crosslinkable polymer and the roll 20 is driven in rotation in the opposite direction to the direction in which the metal strip 1 runs.

By way of example, the metal strip 1 is preheated to a temperature of 140° C. immediately before it passes over the back-up roll 3 and runs at a speed of 30 m/min.

At the exit of the die 11 of the extruder, the sheet 30 formed by forced flow at a temperature greater than the softening temperature of the crosslinkable polymer in the uncrosslinked state is pressed against the roll 20 so as to form the film 31 of crosslinkable polymer with a uniform thickness corresponding approximately to the thickness of the coating to be formed on the metal strip 1.

Because of the pressure exerted by the roll 20 and the back-up roll 3 on the metal strip 1, all or part of the film 31, widthwise, is transferred from the roll 20 onto the surface of the metal strip 1 to be coated.

Next, the metal strip 1 thus coated passes through the curing means 5 and then through the means 6 for cooling the film 31 of crosslinkable polymer.

In the case of the second embodiment shown in FIGS. 3 and 4, the thin fluid film 31 of thermally or physically crosslinkable polymer is applied in the following manner.

The metal strip 1 is maintained at a temperature equal to or greater than the softening temperature of the crosslinkable polymer in the uncrosslinked state, and the rolls 20 and 21 are driven in rotation in the opposite direction to the direction in which the metal strip 1 runs.

At the exit of the die 12 of the extruder, the sheet 30 formed by forced flow at a temperature greater than the softening temperature of the crosslinkable polymer is pressed against the roll 20 so as to form the intermediate sheet 30*b* of crosslinkable polymer with a uniform thickness.

Because of the pressure exerted by the roll 20 and the metal strip 1 on the applicator roll 21, the intermediate sheet 30*b* is transferred from the roll 20 onto the applicator roll 21 which forms the film 31, and this film 31 is transferred from the applicator roll 21 onto the surface of the metal strip 1 to be coated.

Next, the metal strip 1 thus coated passes through the curing means 5 and then through the means 6 for cooling the film 31 of crosslinkable polymer.

The film 31 of crosslinkable polymer may be deposited on a bare metal strip, made of steel or aluminium or aluminium alloy, or on a precoated or prepainted metal strip.

The coating thus produced on the metal strip 1 has, for example, a thickness of between 5 and 50 $\mu$m with a thickness uniformity of a few microns, despite the appreciable discrepancies in the flatness or thickness heterogeneity of the metal strip 1.

Other means for forming the sheet 30 by forced flow may also be used.

Thus, the means for forming the sheet 30 by forced flow may be formed by a rigid block of crosslinkable polymer applied with controlled pressure, in order to deposit particles of crosslinkable polymer onto the roll 20 and form the said sheet 30, or else by a system for transferring a powder of crosslinkable polymer onto this roll 20, using an electrostatic field, in order to form this sheet 30.

According to other alternative embodiments, the means for forming the sheet 30 by forced flow may be formed by a system for spraying a fluid crosslinkable polymer onto the roll 20 or by a system for applying a continuous web of crosslinkable polymer, produced beforehand in order to form the sheet 30, to this roll 20.

According to another alternative embodiment, the means for forming the sheet 30 by forced flow may be formed by a rotating bar placed between the die 12 and this roll 20.

The sheet 30 and the film 31 of crosslinkable polymer may have a width of less than the width of the metal strip 1 in order to coat only part of this metal strip 1 or a width greater than the width of this metal strip 1 in order to coat the said metal strip 1 in its entirety.

If the sheet 30 and the film 31 have a width greater than the metal strip 1, as shown in the figures, there is, on either side of the useful zone of application to the said metal strip 1, a portion of crosslinkable polymer which is not applied to this metal strip 1.

This excess crosslinkable polymer has to be removed so as to prevent it from creating an additional thickness on the roll 20 or on the applicator roll 21.

This is because, given the space existing between the roll 20 and the back-up roll 3 or the applicator roll 21 and the back-up roll 3 on either side of the metal strip 1 and because of the thickness of this metal strip 1, the excess crosslinkable polymer remains on the roll 20 or on the applicator roll 21.

In order to remove this excess material, several solutions may be envisaged.

To do this, the coating apparatus 10 is equipped with means 40 for removing the excess crosslinkable polymer deposited on the roll 20.

According to a first embodiment shown in FIGS. 1 and 2, the means 40 for removing the excess crosslinkable polymer deposited on the roll 20 are formed by two scrapers, 41*a* and 41*b* respectively, for example made of metal, in contact with the roll 20 in each region located outside that region of the said roll 20 which is in contact with the metal strip 1.

The scrapers 41*a* and 41*b* in contact with the roll 20 are located upstream of the generatrix along which the sheet 30 is applied to this roll 20 with respect to the direction of rotation of the said roll 20.

The transverse position of the scrapers 41*a* and 41*b* on the roll 20 may be slaved, by suitable means, not shown, to the width of the metal strip 1 and/or to the transverse position of this metal strip 1 on the back-up roll 3.

This is because the position of this metal strip 1 on the back-up roll 3 may vary.

The scrapers 41*a* and 41*b* are therefore in contact with the roll 20 and remove the excess crosslinkable polymer by rubbing against the said roll 20.

According to a variant, the means 40 for removing the excess crosslinkable polymer on the roll 20 may be formed by two recovery rolls placed between the scrapers 41*a* and 41*b* and the roll 20.

According to yet another variant, the means for removing the excess crosslinkable polymer on the roll 20 may be formed by a recovery roll inserted between the roll 20 and a scraper having a length at least equal to the length of the roll 20.

In the case of the embodiment shown in FIGS. 3 and 4, the excess material which has not been deposited on the metal strip 1 remains on the applicator roll 21 and is transferred onto the roll 20 because of the pressure exerted on the said applicator roll 21.

In this case, the means 40 for removing the excess crosslinkable polymer deposited on the roll 20 are formed by at least one scraper, for example made of metal, in contact with the roll 20.

Figure 5:
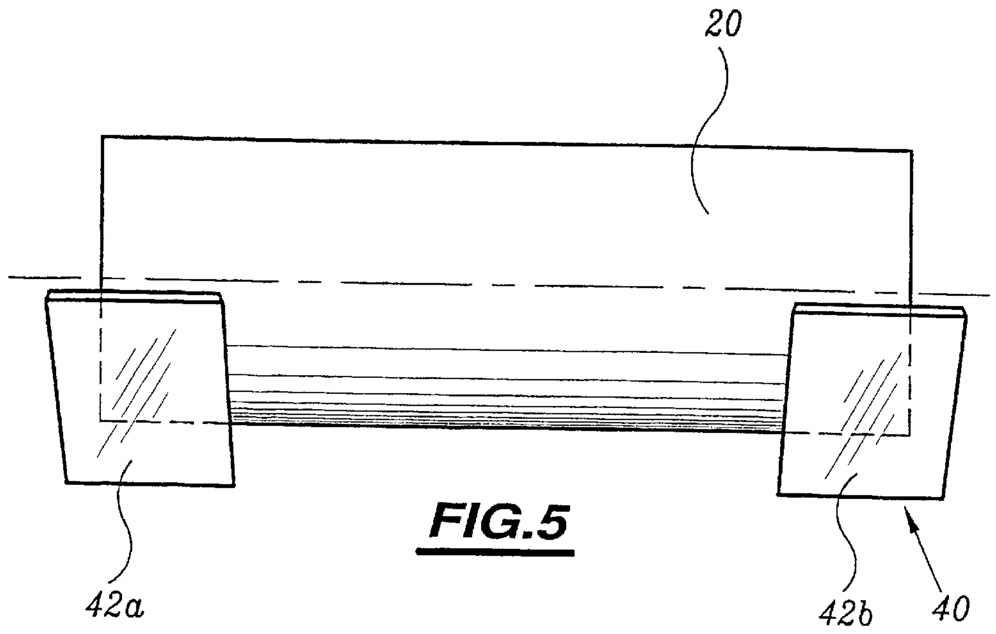
FIGS. 5 and 6 are two schematic side views of the means for removing the excess crosslinkable polymer.

According to one illustrative embodiment, shown in FIGS. 4 and 5, the means 40 for removing the excess crosslinkable polymer deposited on the roll 20 are formed by two scrapers, 42*a* and 42*b* respectively, for example made of metal, each in contact with a lateral edge of the roll 20 upstream of the application generatrix of the sheet 30 on this roll 20.

Preferably, the transverse position of the scrapers 42*a* and 42*b* on the roll 20 is slaved, by suitable means, not shown, to the width of the metal strip 1 and/or to the transverse position of this metal strip 1 on the back-up roll 3.

The scrapers 42*a* and 42*b* are therefore in contact with the roll 20 and remove the excess crosslinkable polymer by rubbing against the said roll 20.

The second solution consists in equipping the applicator roll 21 with means 40 for removing the excess crosslinkable polymer.

Figure 6:
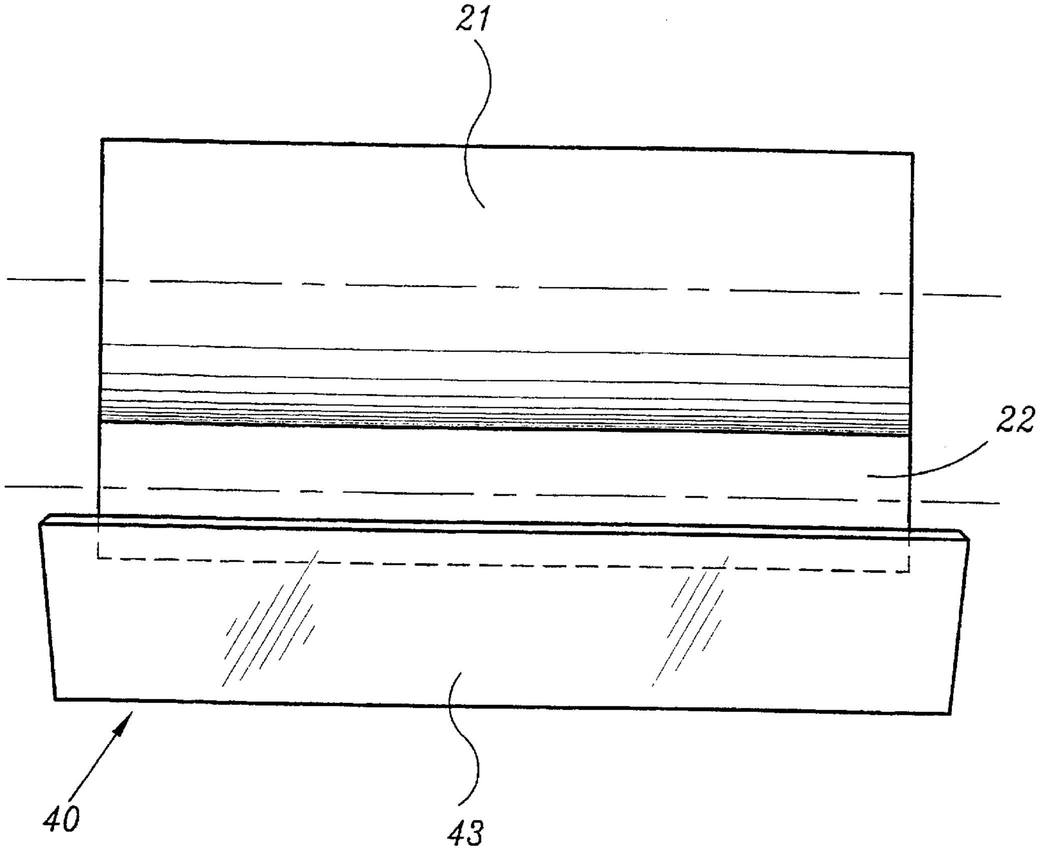

As shown in FIG. 6, these means 40 for removing the excess crosslinkable polymer on the applicator roll 21 are formed by a recovery roll 22, in contact with the applicator roll 21 and by at least one scraper 43 in contact with the said recovery roll 22.

Thus, the excess crosslinkable polymer deposited on the applicator roll 21 is transferred onto the recovery roll 22 because of the pressure exerted by the said recovery roll on the applicator roll 21 and this excess crosslinkable polymer is removed from the recovery roll 22 by the scraper 43.

According to another embodiment, the means for removing the excess crosslinkable polymer on the applicator roll 21 may be formed by a recovery roll 22 and by two scrapers each in contact with one lateral edge of the said recovery roll 22.

The latter two embodiments may also apply in the case of the plant shown in FIGS. 1 and 2.

The means for removing the excess crosslinkable polymer deposited on the roll 20 or on the applicator roll 21 avoid having to add inserts into the slot 12 of the extrusion die 11 so as to size the sheet 30 of crosslinkable polymer as soon as it leaves the die 12 and to accommodate variations in the width and transverse positioning of the metal strip 1 within the predefined tolerance limits.

According to an alternative embodiment, the point of application of the film 31 of the crosslinkable polymer may be located at a place other than facing the back-up roll 3 supporting the metal strip 1, for example on a taut free strand of this metal strip 1 downstream of the said back-up roll 3.

According to another alternative embodiment, both faces of the metal strip 1 may be coated with a film 31 of crosslinkable polymer.

In this case, an apparatus 10 for applying the film 31 is placed on one side of the metal strip 1 and another apparatus for applying the film 31 is placed on the other side of the said metal strip 1.

Application of the film 31 onto each face of the metal strip 1 may be offset or simultaneous. For simultaneous application, the back-up roll 3 is omitted and replaced with an applicator roll of the second application apparatus. The applicator roll of each apparatus forms a back-up roll supporting the metal strip.

Moreover, the transverse position of the extrusion die 11 may be permanently centered with respect to the metal strip 1 by placing this extrusion die 11 on a transversely moveable support and by connecting this die to the extruder via a hose which makes it possible to slave the position of this extrusion die 11 with respect to the metal strip 1 according to the variations in the transverse position of the said metal strip 1 with respect to the back-up roll 3.

According to yet another variant, a lubricant may be deposited on the applicator roll 20 outside the region in contact with the metal strip 1 so as to facilitate the operation of the scrapers 41*a* and 41*b* for removing the excess crosslinkable polymer.

By way of example, the crosslinkable polymer compound is formulated as follows:

85% by weight of a polyester polyol called URALAC P1460 from DSM Resins (The Netherlands) having the following characteristics:
- average number of —OH per molecule: $F_{OH.av}$=3
- hydroxyl number of the polyol: $I_{OH}$=37 to 47
- average molar mass (by weight) $M_w$=20,000 g/mol
- average molar mass (by number of molecule) $M_n$=4090
- polydispersity index $M_w/M_n$: $I_p$=4.9 (the hydroxyl number of the polyol, $I_{OH}$, being defined as the necessary amount of potassium—in mg—to neutralize all the hydroxyl functional groups; therefore: $F_{OH,av}=I_{OH}\times M_n/56100$);

as hardener, 15% by weight of a blocked isocyanate called VESTAGON BF 1540 from HÜLS, essentially consisting of IPDI uretidione;
- average number of —NCO per molecule: $F_{iso:av}$=2
- melting point between 105° C. and 115° C.
- crosslinking deblocking temperature=160° C.
- total amount of NCO radicals=14.7 to 16% by weight;
- proportion of free (unblocked) NCO radicals <1% by weight;
- viscosity for a shear rate of 10 $s^{-1}$:
  - at 120° C.: 900 Pa·s
  - at 130° C.: 400 Pa·s
  - at 140° C.: 180 Pa·s at 150° C.: 80 Pa·s.

This compound is entirely in the fluid and/or viscous state above a temperature of 120° C. and its rapid-crosslinking temperature is between 170° and 250° C.

The crosslinkable polymer may also be pigmented and filled, for example to 40% or more by weight, with titanium oxide.

The table below demonstrates the effect of the thermal conditioning of the crosslinkable polymer between the region of formation of the sheet 30 and the region of application of the film 31 on the viscosity of this crosslinkable polymer so as to facilitate the transfer and application of the film 31 onto the metal strip 1.

| Polymer temperature (° C.) | Polymer viscosity (Pa.s) | Torque (daN/m) | Film thickness (mm) | Transfer | Appearance |
|---|---|---|---|---|---|
| 120 | 120 | 34 | 40 | partial | not smooth |
| 130 | 60 | 30 | 40 | partial | not smooth |
| 140 | 30 | 20 | 40 | total | smooth |
| 150 | 15 | 17 | 40 | total | smooth |

As indicated in this table, the higher the temperature of the crosslinkable polymer the lower its viscosity, thereby making it possible to reduce, almost by half, the torque between the roll for forming and applying the film and the metal strip and to obtain a smooth surface appearance of the coating on the said metal strip.

Because of the reduction in torque, the pressure at the applicator roll is lowered, thereby making it possible to significantly reduce the wear of the applicator roll for applying the film of crosslinkable polymer to the metal strip. This is all the more important when the surface of this applicator roll is made of deformable material.

This is because, with temperatures of the crosslinkable polymer of about 120 or 130°, in order to obtain a smooth appearance of the coating on the metal strip 1, a torque having a value of greater than 60 daN/m must be reached.

This value results in rapid wear of the applicator roll.

The coating apparatus according to the invention makes it possible, to obtain a coating of crosslinkable polymer with a uniform thickness of, for example, between 5 and 50 $\mu$m and applied homogeneously to a metal strip exhibiting significant roughness of amplitude comparable to the film thickness, by means of the perfect contact between the applicator roll and the surface of the metal strip to be coated, despite the discrepancies in flatness and in thickness heterogeneity of the said metal strip.

The speed of the applicator roll may be adjusted to a level substantially higher or lower than the speed at which the metal strip runs so as to obtain perfect continuity of the coating and an excellent surface finish of this coating [lacuna] crosslinkable polymer transferred to this metal strip.

Moreover, the surface energy of the applicator roll is tailored to the crosslinkable polymer in order to allow proper spreading of the sheet on this applicator roll.

The coating apparatus according to the invention may also be used for a downward or horizontal metal strip.

The fact that the temperature of formation of the sheet is lower than the crosslinking temperature of the polymer is an important characteristic in the case of thermosetting polymers since the forced flow through an extrusion slot involves significant stagnation of the polymer, which is necessary for good distribution of this polymer over the entire width of this extrusion slot, and there must be no risk of the said polymer crosslinking therein.

Moreover, the coating apparatus according to the invention makes it possible to be able to continuously coat metal strips of different widths and to simultaneously coat several metal strips placed parallel to each other and to overcome the problem of fluctuations in the width and transverse positioning of the metal strip or strips by simple and effective means.

The coating apparatus according to the present invention makes it easier for the coating of crosslinkable polymer to be fed in a regular and uniform manner by selecting the feed mode best suited, depending on the product to be employed.

The advantage of this wide choice is particularly great in the case of highly reactive thermosetting coatings which cannot be fed at a high temperature close to the reactivity range.

The temperature of the material delivered by the supply system located upstream of the applicator roll is limited to a value below the crosslinking onset temperature in order to avoid any risk of the product changing in the supply system and any risk of this system becoming blocked.

Because of this limitation in temperature, it is difficult to obtain good transfer onto and good spread over the metal strip.

By virtue of the invention, this apparatus also makes it possible, in the case of a chemical crosslinking process, to raise the temperature of the crosslinkable polymer so as to reduce its viscosity and to facilitate its transfer onto and spread over the metal strip.

During contact with the applicator roll, the material may be subjected to very significant heating, but for a very short time, which makes it possible to avoid any risk of the product crosslinking at this point.

Finally, the apparatus according to the invention makes it possible to compensate for fluctuations in width or in transverse position of the metal strip during the application and to get round the problems of lack of uniformity of the metal strip and thus to produce a surface coating of uniform thickness on a non-uniform metal substrate.

What is claimed is:

1. Process for the continuous coating of at least one metal strip (1) with a fluid film (31) of crosslinkable polymer containing no unreactive solvent or diluent and the softening temperature of which is greater than 50° C., the said film (31) having a thickness of less than that of the metal strip (1), characterized in that:

- the metal strip (1) is made to run continuously over at least one back-up roll (3);
- a sheet (30) of the said crosslinkable polymer is formed, on a roll (20) and by forced flow at a temperature greater than the softening temperature of the crosslinkable polymer, the said polymer being crosslinkable in the melt state and having a viscosity greater than 10 Pa·s under the conditions of formation of the said sheet, the temperature of formation of this sheet (30) being lower than the crosslinking onset temperature of the crosslinkable polymer and the said roll (20) being driven in rotation in the opposite direction to the direction in which the metal strip (1) runs;
- the said film (31) of crosslinkable polymer is formed from the said sheet (30);
- the film (31) is completely transferred, thicknesswise, onto the metal strip (1); and
- between the region of formation of the sheet (30) on the roll (20) and the region of application of the film (31) to the metal strip (1), the crosslinkable polymer is thermally conditioned using suitable methods for lowering the viscosity of this crosslinkable polymer to a value less than the said viscosity measured under the conditions of the said forced flow.

2. Process according to claim 1, further characterized by the step of lowering the viscosity of this crosslinkable polymer by at least a factor of 2.

3. Process according to claim 1, further characterized by the step of choosing the temperature of the crosslinkable polymer to exceed the crosslinking onset temperature of this polymer.

4. Process according to claim 1, characterized in that the film (31) of crosslinkable polymer is formed on the said roll (20) and the said film is completely transferred, thicknesswise, from this roll (20) onto the metal strip (1) by compressing this metal strip between the back-up roll (3) and the roll (20) in order to obtain a coating of uniform thickness.

5. Process according to claim 1, characterized in that the roll (20) has a deformable surface and the back-up roll (3) has a hard surface.

6. Process according to claim 1, characterized in that the roll (20) has a hard surface and the back-up roll (3) has a deformable surface.

7. Process according to claim 1, characterized in that:

- an intermediate sheet **(30*b*) of crosslinkable polymer is formed on the said roll (20) from the said sheet (30)** in the melt state;
- this intermediate sheet **(30*b*) is transferred onto an intermediate transfer element (21) by compressing it against the roll (20), the said transfer element (21) being inserted between the roll (20) and the metal strip (1) and being driven in rotation in the opposite direction to the direction in which the said metal strip (1)** runs;
- the said film (31) of crosslinkable polymer is formed on the transfer element (21);

and the film (31) is completely transferred, thicknesswise, from the transfer element (21) onto the metal strip (1) by compressing the metal strip (1) between the transfer roll (21) and the back-up roll (3) in order to obtain a coating of uniform thickness.

8. Process according to claim 1, characterized in that the transfer element (21) has a deformable surface and the roll (20) and the back-up roll (3) each have a hard surface.

9. Process according to claim 1, characterized in that the transfer element (21) has a hard surface and the roll (20) and the back-up roll (3) each have a deformable surface.

10. Coating process according to claim 1, characterized in that the metal strip (1) is preheated to a temperature approximately equal to or greater than both the temperature of the fluid film of crosslinkable polymer and the softening temperature of this crosslinkable polymer.

11. Coating process according to claim 1, characterized in that the roll (20) is heated to a temperature approximately equal to or greater than both the temperature of the sheet (30) and the softening temperature of this crosslinkable polymer.

12. Coating process according to claim 7, characterized in that the transfer element (21) is heated to a temperature greater than or equal to the temperature of the roll (20).

13. Coating process according to claim 1, characterized in that the crosslinkable polymer is thermally conditioned by heating the roll (20) and/or the transfer element (21) and/or by applying a complementary heat flux to the intermediate sheet **(30*b*) and/or to the film (31)**.

* * * * *

UNITED STATES PATENT AND TRADEMARK OFFICE

CERTIFICATE OF CORRECTION

PATENT NO. : 6,562,407 B1 Page 1 of 1
DATED : May 13, 2003
INVENTOR(S) : Claude Bonnebat, Frederick Jenny and Thierry Soas It is certified that error appears in the above-identified patent and that said Letters Patent is hereby corrected as shown below:

Title page,
Item [22], should read as follows:
-- [22] PCT Filed: December 7, 1999 --

Signed and Sealed this

Eighth Day of June, 2004

JON W. DUDAS
*Acting Director of the United States Patent and Trademark Office*